Sept 10, 1957     W. F. WILLIAMS     2,806,168
WELDING CONTROL SYSTEM
Filed March 10, 1954
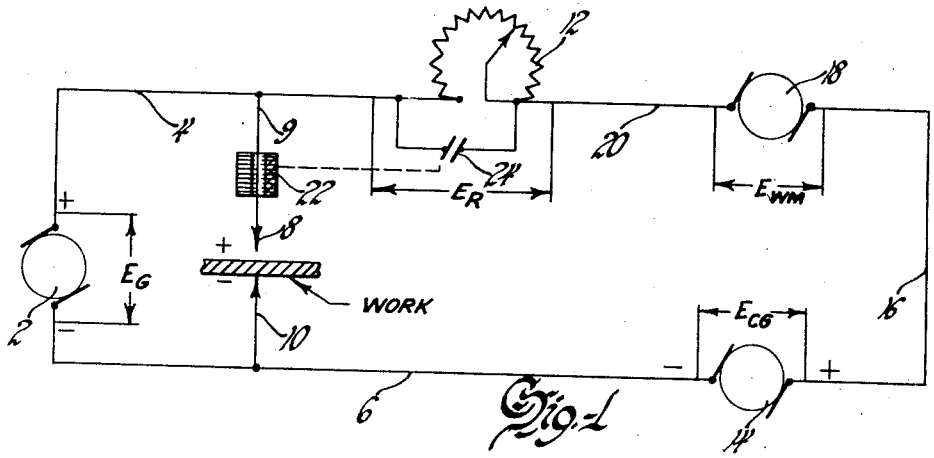
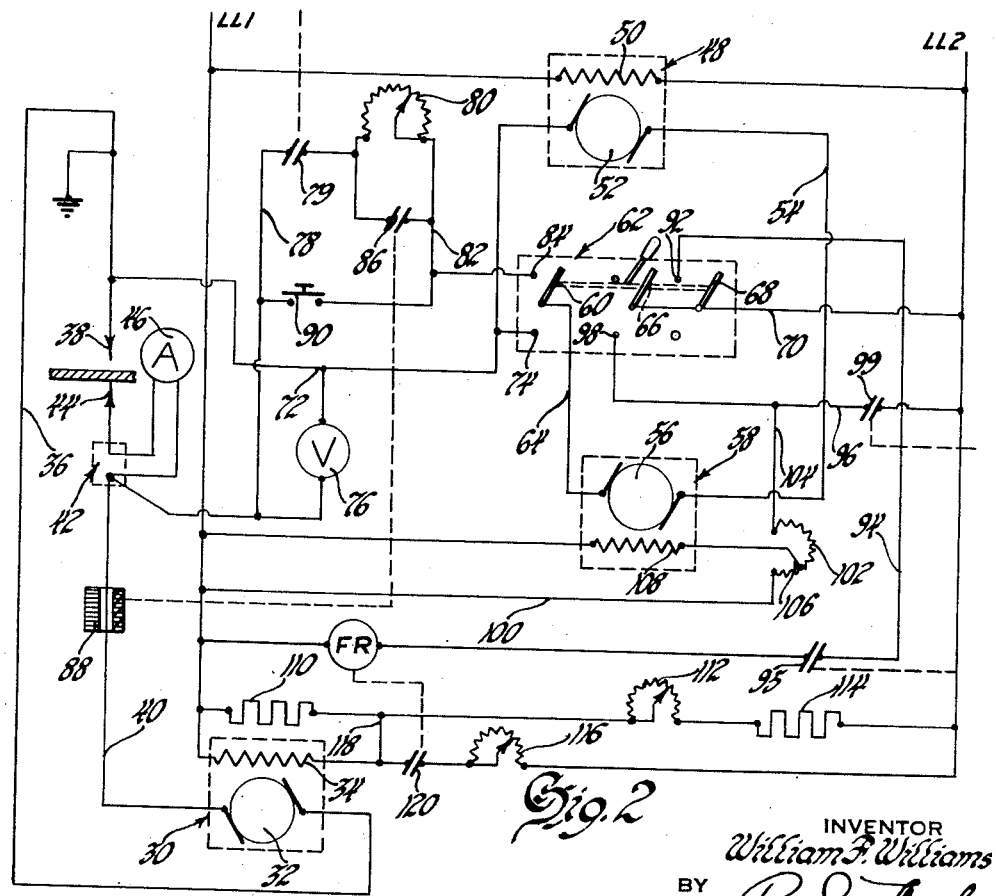
INVENTOR
William F. Williams
BY
R. E. Fowler
ATTORNEY

United States Patent Office 2,806,168
Patented Sept. 10, 1957

2,806,168
WELDING CONTROL SYSTEM

William F. Williams, Flint, Mich., assignor to General Motors Corporation, Detroit, Mich., a corporation of Delaware Application March 10, 1954, Serial No. 415,207

4 Claims. (Cl. 314—75)

This invention relates to arc welding control systems and particularly to control systems for submerged arc welding machines.

Automatic submerged arc welding provides high production and good penetration. In making a succession of spaced welds it is necessary to break and start the weld again between each pair. Such a method of laying a plurality of spaced welds along a common joint to secure two members together is known as "skip" welding. A control system for such a welder is shown in Spice et al. 2,635,165. As described in the Spice patent, a submerged arc weld is created along a certain length of joint, then the feed for the weld rod is stopped but the arc voltage is maintained to burn off the rod and extinguish the arc, then the voltage is cut off. The voltage is maintained off for a sufficient time to allow travel to the initiating point for the next weld at which time the weld rod has been fed down near the work. Welding voltage is next applied, and an arc is drawn to initiate the next weld.

In the operation of this type of system it is sometimes difficult to start the weld when the proper position has been reached, and, as a result, a part of the plurality of welds holding two pieces together will be good and part bad to cause later failure or the necessity of repairing welds by hand.

It is, therefore, an object in making this invention to provide a weld control circuit having good starting characteristics.

It is a further object in making this invention to provide a control circuit for an automatic submerged arc welder having good weld starting characteristics.

With these and other objects in view which will become apparent as the specification proceeds, my invention will be best understood by reference to the following specification and claims and the illustrations in the accompanying drawings, in which:

Figure 1 is a diagrammatic showing of a control circuit embodying my invention; and Figure 2 is a circuit diagram of a weld control system including the same.

In the previously mentioned automatic submerged arc weld method, the parts to be welded together are placed in juxtaposition and then moved slowly past the end of the weld rod. The rod, in turn, is fed down toward the work as it is consumed and welding power is supplied to the rod at proper intervals to produce welds at desired points. Specifically, the parts are clamped in a fixture which can be moved. The welding head is lowered and the welding wire or rod is inched toward the work until it makes contact. The granular flux is then fed to cover the joint and the fixture is driven. At the proper point for the beginning of the first weld, the welding circuit is closed by any suitable means such, for example, as a cam. At the end of the weld, the feed for the wire is stopped but the welding voltage is maintained to burn off the end of the wire and give a clean break. After a burn-off interval, the power is cut off and the arc stopped. The work is allowed to move past the wire until a second point is reached at which time the wire is fed down toward the work until contact is made, power is applied and another weld cycle is performed. At this point the wire has to make contact with the work through a cover of flux and the arc has to be established on a moving part.

Figure 1 illustrates diagrammatically the basic principles of my improved circuit. In that figure the welding generator 2 is connected to supply lines 4 and 6. The upper electrode 8, which would be the welding wire, is connected to line 4 through the line 9 and the work is connected through line 10 to line 6. Power line 4 extends to one terminal of a rheostat 12 and line 6 to one terminal of a control generator 14. The opposite terminal of the control generator is connected through line 16 to the wire feed motor 18. The opposite side of the wire feed motor is connected through line 20 to the rheostat 12. The operating core 22 comprising, with the line 9, a current relay, is mounted around line 9 and magnetized by the current flow therethrough. The core 22 is formed of a series of laminations having a central opening for the passage of the wire and a slot through which the wire can be slipped so that the core can be placed on one of the welding cables. Contacts 24, mounted adjacent the core and operated by the magnetizing of core 22, are connected directly across the rheostat 12 and, when closed, provide a shunt circuit around the same. The wire feed motor is a reversible one which feeds the wire toward or away from the work to maintain the proper spacing of the end of the wire from the work in order to provide the proper arc. The direction of rotation depends upon the polarity of the voltage applied thereto. In general, the voltage and its polarity are determined by the balance between the output of the control generator 14 as opposed to the arc voltage which is basically the voltage of the welding generator.

In the operation of the previous system shown in Patent 2,635,165, the wire motor 18 is energized to feed the wire down toward the work until the wire touches the work and at this time the control generator is deenergized. The system was then in condition to start. During the travel toward the work and omitting any voltage drop across the rheostat, since that was not included in the prior circuit, the voltage equation is:

$$Ewm = Eg - Ecg$$

where $Ewm$ = the voltage across the wire motor
$Eg$ = the voltage of the welding generator, and
$Ecg$ = the voltage of the control generator Assuming exemplary values:

$$Ewm = 15 - 0$$
$$= 15 \text{ volts}$$

causing the wire motor to drive during feeding down of the wire.

When the electrode makes contact with the work, the equation becomes:

$$Ewm = 0 - 0$$
$$= 0$$

since the electrode now contacts and the wire feed motor stops.

The starting circuit for the welder is now actuated by any suitable means, which energizes the control generator and it develops its rated voltage $$Ewm = 0 - 25$$
$$= -25$$

since the welding generator is still shorted by the work and the control generator develops voltage of opposite polarity. This causes the wire motor to run in the opposite direction and draws the electrode away from the work.

Upon pulling the electrode wire away from the work the welding generator applies full welding voltage and the equation becomes:

$$Ewm = 80 - 25$$
$$= 55 \text{ volts}$$

An arc is established and the wire feed motor again reverses and drives the wire toward the work at the rate that it it is consumed to maintain the arc.

However, with this system it is noted that the end of the wire is fed down into contact with the work prior to initiating the welding start circuit, is backed away to draw the arc and then driven toward the work to maintain the arc as the wire is consumed. At times the wire may press against the work too firmly and the wire motor may not be able to retract the wire fast enough to properly intially establish the arc which may cause freezing of the wire to the work or hunting of the wire feed motor.

In order to overcome these difficulties the rheostat 12 has been inserted in the system together with the current relay 22 with its contacts 24 to shunt out the rheostat. With this change the wire feed motor does not reverse to pull the wire away to inaugurate the weld but the wire is continuously fed toward the work, thus eliminating the problems just mentioned.

In Figure 1 the voltage equation is:

$$Ewm + Er = Eg - Ecg$$

Where $Er$ is the voltage drop across the rheostat and the other voltages represent the same factors as previously.

Prior to initiating the starting sequence of the welder, the equation is:

$$Ewm + Er = 15 - 0$$
$$= 15 \text{ volts}$$

since the control generator is open and the welding generator only partially energized.

Under these conditions the wire motor starts to feed the wire toward the work. However, before the wire reaches the work, the starting sequence is initiated by any suitable means to short out series resistance in the generator field to bring it up to full strength and energize the control generator. The equation becomes:

$$Ewm + Er = 80 - 25$$
$$= 55 \text{ volts}$$

But the rheostat is so set that the drop across the rheostat or $Er = 40$ volts, leaving $Ewm = 15$ volts as before. This keeps the wire feeding down at an even controlled rate.

As soon as the wire touches the work an arc is established and welding current flows. The wire motor does not reverse direction at any time. As soon as current flows in the welding circuit the coil 22 will be energized to close its contacts 24 to short out the rheostat leaving the circuit as it was previously for normal welding operation. Figure 1 therefore provides a control circuit in which the wire electrode is constantly fed toward the work at a low rate until an arc is established which immediately increases the speed of the wire feed to the rate at which it is consumed to maintain said arc.

Figure 2 shows a circuit diagram of a welding control embodying the principles of Figure 1. In that figure the welding generator 30 includes an armature 32 and a field 34. Line 36 connects one side of the armature 32 to the work illustrated at arrow 38. The work may be at ground potential. The other armature terminal is connected through line 40 and shunt 42 to the welding electrode 44. An ammeter 46 is connected across the shunt 42 to indicate the current flow. This constitutes the main welding circuit.

The control circuit is provided with power from two lines LL1 and LL2. The wire feed motor 48 has its field 50 connected directly across the lines LL1 and LL2. One terminal of the armature 52 of the wire feed motor is connected through line 54 to armature 56 of the control generator 58. The other side of the armature 56 is connected to one of the movable blades 60 of a multi-position, multi-section switch 62 through line 64. Two other movable blades 66 and 68, while commonly operated with blade 60, are insulated therefrom and are connected to power line LL2 by line 70. The line 72 connects power line 36 to one terminal of the armature 52 of the wire feed motor. Line 72 is also connected to stationary contact 74 of switch 62. A voltmeter 76 is connected across lines 40 and 72 to read the arc voltage or voltage across the electrodes.

Conductor 78 is connected to the voltmeter line connected to line 40 and, through contacts 79, controlled by the automatic system, to one side of control rheostat 80, the opposite side of the rheostat being connected through line 82 to stationary contact 84 of switch 62. A pair of normally open relay contacts 86 are connected in shunt around the rheostat 80 and are actuated by the magnetization of current relay core 88 as shown by the dash line. The current relay core 88 is mounted adjacent the line 40 which carries the welding current and is affected by the flow therein. A second shunt circuit including a manually operable switch 90 for "inching" the wire motor feed is connected across the rheostat 80 to provide for manually completing a circuit to the wire feed motor.

Stationary contact 92 of switch 62 is connected to line 94 which extends to a pair of contacts 95, operated by the automatic system, which are connected to a relay coil FR, the opposite terminal of which is connected to line LL1. Line 96 connects stationary contact 98 of switch 62 to contacts 99, which are actuated by the automatic system as shown in Spice 2,635,165, which are also connected to line LL2. Line 100 connects one terminal of resistor 102 to line LL1 and tie line 104 connects the other side of this resistor to line 96. An adjustable tap 106 on resistor 102 is connected through field winding 108 of the control generator 58 to power line LL1. A fixed resistance 110, a variable resistance 112 and a second fixed resistance 114 are connected in series relation across the lines LL1 and LL2. One terminal of the field 34 of the welding generator is connected to line LL1 and the opposite terminal through a pair of contacts 120 operated by relay FR to a variable resistance 116. The line LL2 is also connected to the resistance 116. Tie line 118 interconnects a point intermediate resistances 110 and 112 with a second point between the field winding 34 and contacts 120. Other automatically controlled contacts from the master timed system with which this system is used and which are operated at the proper instant to inaugurate the starting cycle have been omitted for the sake of simplicity.

In the operation of the system illustrated in Figure 2, power is applied to lines LL1 and LL2, the generators 30 and 58 are being driven and switch 62 is closed in the upper position. Closure in the lower position is for running the wire up only. When the automatic switches 79, 99 and 95 are closed, the full load current is applied to the field 34 of the welding generator and it is completely energized to produce full open circuit voltage. Also, the control generator 58 is fully energized. The welding generator voltage being high although opposed by the full voltage of the control generator would cause the wire feed motor to feed the wire electrode toward the work at too rapid a rate except for the insertion of resistance 80 which is in series with the armature 52 at this time and drops the voltage actually applied to the armature 52 to a reasonable value. This circuit for the wire motor is as follows: line 72, armature 52, line 54, armature 56, line 64, switch arm 60, contact 84, line 82, rheostat 80, closed contacts 79, line 78, shunt 42 to the other side of the welding gap. Thus at this time there are connected in series across the welding generator voltage, the wire feed motor 48, resistance 80 and the control generator 58 poled to oppose the welding voltage. The drop across the resistance 80 is sufficient to leave only enough voltage to feed the wire down toward the work at a moderate rate. No current is flowing at this time in the welding circuit. The speed of the motor may be adjusted by varying the setting of the rheostat 80.

At the instant that the wire touches the work an arc is established since full voltage has been maintained on the wire electrode. On the establishment of the arc the voltage across it drops causing the wire feed motor to stop its forward feed but it does not reverse. As the current to the weld flows, the current relay formed of core 88 and the welding cable will close its contacts 86 to shunt out the rheostat 80. This will leave in the wire motor current the control generator and the arc voltage opposing the same which will provide the armature voltage to feed the wire at the rate that it is consumed.

If it is desired to manually move the weld rod down toward the work at such times as the automatic system is not active, the wire feed motor may be energized by closing the manual push button switch 90, which completes an obvious circuit for the wire feed motor where contacts 79 are open. If it is desired to back the weld rod away from the work or to run it up, then the manual switch 62 may be closed in its lower position to apply the full output of the control motor to the wire feed motor to cause it to drive the wire up.

I claim:

1. A control system for a welding machine having a supply of wire electrode that is fed toward the work as it is consumed including, a source of welding power, a source of generated power for control, feeding means for the wire connected in a series circuit with both sources and operated by the algebraic sum of the voltages thereof, resistance means connected in said series circuit and means for including or removing said resistance means in circuit with said feeding means, said last-named means being operated by the flow of welding current and including said resistance means when the current is below a minimum value.

2. In a welding control system, the combination of a supply of wire electrode, feeding means for the wire electrode, a welding power circuit connectible to said wire electrode, control power generating means connected in polarity opposing relation to said wire electrode and in a series circuit with the feeding means so that the latter is energized by the algebraic sum of the two sources, resistance means connected in said series circuit with the feeding means, and current responsive means mounted in juxtaposition to the welding power circuit and connected to the resistance means to effectively remove the resistance means from the circuit at any time when a minimum welding current flows.

3. In a control circuit for a welding machine having a supply of welding wire electrode that is fed toward work, a source of welding power connected to said wire electrode, a source of control power, a wire feed motor for feeding the wire electrode, a variable resistance connected in a series circuit with the wire feed motor and the source of control power, said series circuit being connected across the welding electrode and the work with the polarity of the source of control power in opposition to the welding power, a shunt circuit connected around the resistance, switch contacts in said shunt circuit, and a current relay actuating said switch contacts mounted adjacent the welding circuit and energized by the flow of a minimum welding current to complete the shunt circuit and effectively remove the resistance as soon as an arc is struck.

4. In a control circuit for a welding machine having a supply of welding wire electrode that is fed toward work, a source of welding power connected to said wire electrode, a source of control power, a wire feed motor for feeding the wire electrode, a variable resistance connected in a series circuit with the wire feed motor and the source of control power, said series circuit being connected across the welding electrode and the work with the polarity of the source of control power in opposition to the welding power, a shunt circuit connected around the resistance, switch contacts in said shunt circuit, a current relay actuating said switch contacts mounted adjacent the welding circuit and energized by the flow of a minimum welding current to complete the shunt circuit and effectively remove the resistance, a second shunt circuit connected around the resistance and manual switching means in said last-named shunt circuit to complete the circuit around the resistance at will.

References Cited in the file of this patent

UNITED STATES PATENTS

| | | |
|---|---|---|
| Re. 15,313 | Morton | Mar. 21, 1922 |
| 1,508,738 | Whiting | Sept. 16, 1924 |
| 1,690,489 | Hume | Nov. 6, 1928 |
| 2,364,920 | Shaffer | Dec. 12, 1944 |
| 2,510,204 | Baird | June 6, 1950 |
| 2,635,165 | Spice et al. | Apr. 14, 1953 |